Nov. 28, 1933.     P. CROUT ET AL     1,936,620
MOTOR CONTROL
Filed Oct. 9, 1930     2 Sheets-Sheet 1

Inventors
Carroll Stansbury
Prescott Crout
By Frank H. Hubbard
Attorney

Nov. 28, 1933.    P. CROUT ET AL    1,936,620
MOTOR CONTROL
Filed Oct. 9, 1930    2 Sheets-Sheet 2
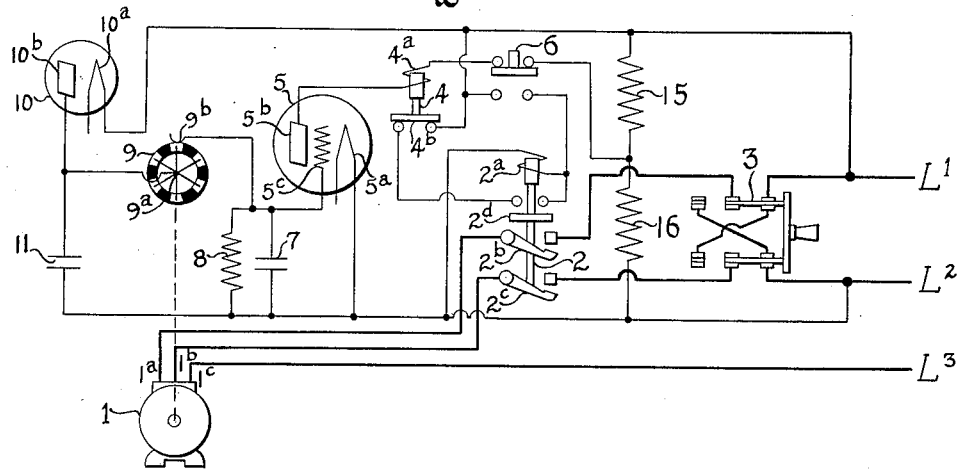
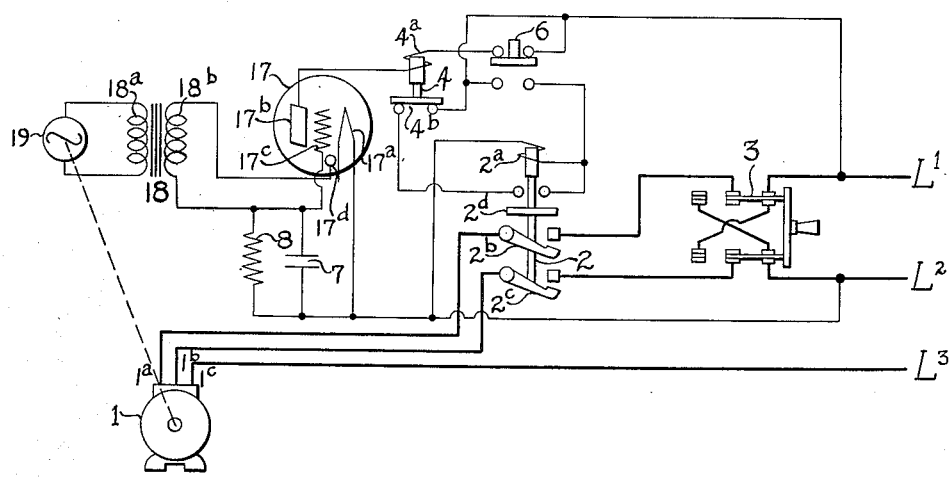

Patented Nov. 28, 1933

1,936,620

UNITED STATES PATENT OFFICE 1,936,620

MOTOR CONTROL

Prescott Crout, Schenectady, N. Y., and Carroll Stansbury, Wauwatosa, Wis., assignors to Cutler-Hammer, Inc., Milwaukee, Wis., a corporation of Delaware Application October 9, 1930. Serial No. 487,526

13 Claims. (Cl. 172—289)

This invention relates to circuit controllers particularly advantageous for controlling motors and other dynamo electric machines.

An object of the invention is to provide improved means for stopping a motor by plugging and terminating the power supply when the motor has come substantially to a standstill and before it begins to rotate in a reverse direction.

Another object is to provide a controller which responds substantially coincidently to certain operating conditions which are to be controlled.

Another object is to provide means for assuring continued discharge through a gaseous discharge tube during successive alternate half cycles of an alternating current, after such discharge has once been initiated during one half cycle.

Other objects and advantages will hereinafter appear.

The accompanying drawings illustrate several embodiments of the invention.

Figs. 2 and 3 show a modification of the system of Fig. 1, wherein means are provided to continue the flow of the control current after it has once been established, while Fig. 4 shows another modification of the system of Fig. 1 wherein other means are provided for making the system responsive to the motor speed.

Figure 1:
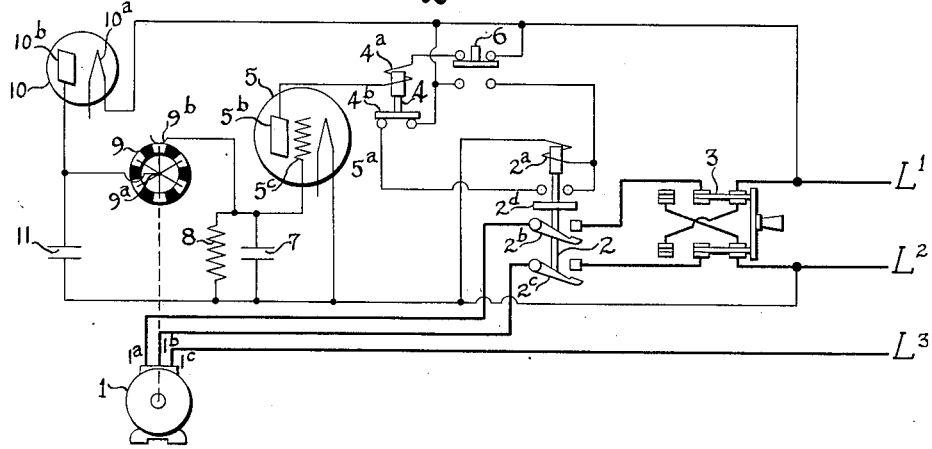
Fig. 1 shows the invention applied to an alternating current motor wherein the latter is disconnected from the line when the speed of its shaft approaches zero value.

Referring to Fig. 1, $L^1$, $L^2$ and $L^3$ are the three wires of a polyphase supply system, supplying power for the operation of a motor 1 which is to be controlled. The motor has the terminals $1^a$, $1^b$ and $1^c$, terminal $1^c$ being directly connected to the line wire $L^3$. A magnet switch 2, has a winding $2^a$, normally open main contacts $2^b$ and $2^c$ and a normally open auxiliary contact $2^d$. Terminals $1^a$ and $1^b$ of the motor are connected to the contacts $2^b$ and $2^c$ respectively. A double pole reversing switch 3 is interposed between the line wires $L^1$ and $L^2$ and the stationary contacts $2^b$ and $2^c$ respectively, whereby it is possible to reverse the connections of said line wires relative to said contacts, to thereby reverse the rotation of the motor in a well known manner. A relay 4, having a magnet winding $4^a$ and normally closed contacts $4^b$ controls the circuit of the magnet winding $2^a$. The relay winding is connected in series with a gaseous discharge tube 5 between the lines $L^1$ and $L^2$. The tube has a cathode $5^a$ which may be of the heated type and be heated in any well known manner, an anode $5^b$ and a grid $5^c$. A push button 6, with a normally open and a normally closed contact, when depressed, closes the former and connects the winding $2^a$ across the lines $L^1$ and $L^2$. The normally closed contact is inserted in the connection between line $L^1$ and anode $5^b$. Between the grid $5^c$ and the line $L^2$ is interposed a condenser 7, paralleled by a resistor 8 of relatively high ohmic value. Mounted on the motor shaft is a drum $9^a$ of a commutator 9, which intermittently makes contact with a stationary brush $9^b$ as the motor revolves. A second gaseous thermionic tube 10 is connected in series with a condenser 11 between the lines $L^1$ and $L^2$ for a purpose to be explained hereafter. The tube 10 has a cathode $10^a$ and an anode $10^b$. The commutator 9 is connected between the grid $5^c$ and the anode $10^b$.

The controller operates as follows:

To operate the motor in the normal direction of rotation the knife switch 3 is thrown to the right and the push button 6 is depressed, whereupon current flows from line $L^1$ over push button 6, through magnet winding $2^a$ to line $L^2$. The magnet switch 2 closes its contacts, completing a circuit from line $L^1$ to contact $4^b$, contact $2^d$ to winding $2^a$, thus by-passing push button 6, so that switch 2 remains closed after the push button is released. Closure of switch 2 also connects terminals $1^a$ and $1^b$ of the motor to the lines $L^1$ and $L^2$ respectively, through the reversing switch 3. The motor thus starts and comes up to speed.

If it is desired to stop the motor by plugging, the switch 3 is thrown in the reverse direction. This reverses the power supply to the motor, switch 2 remaining closed. The motor slows down in speed until ultimately, when it approaches zero speed it is completely disconnected from the power supply in the manner to be described presently.

With the lines $L^1$ and $L^2$ energized, a current flows during alternate half cycles through the valve 10, charging the condenser 11 until the potential of its plate connected to the anode $10^b$ is substantially that of the maximum instantaneous negative potential of line $L^1$. As the commutator 9 revolves, it partly discharges this condenser into the condenser 7, making the grid $5^c$ negative with respect to its cathode and thereby preventing a discharge current from flowing through the tube 5 and the relay coil $4^a$. However, during the intervals, when the circuit at the commutator 9 is interrupted, the charge on the condenser 7 is partially dissipated through the resistance 8 and thus the potential of grid $5^c$ lowered. As the motor speed decreases, the interval between charges of the condenser 7 increases, thus permitting the negative charge of the grid 5 to more and more approach zero value, until at very low speed the interval becomes so long as to permit the grid potential to drop to a value, which permits current to flow through the tube 5. This energizes the relay coil 4ª, and the relay interrupts the current supply to the magnet 2ª, which in turn causes disconnection of the motor from the power supply.

It will be noted that the normally closed contacts of push button 6 open the circuit of relay coil 4ª, when the motor is started by pushing the button, thus preventing the operation of the disconnecting means during acceleration of the motor.

The speed of the motor at which tube 5 functions to disconnect the motor may be adjusted by adjusting the value of the resistance 8 or of the condenser 7. It is also possible to insert a biasing voltage in the circuit of the grid 5ᶜ in a well known manner, to thereby modify the response of the tube 5 to the discharge potential of the condenser 7.

Figure 2:
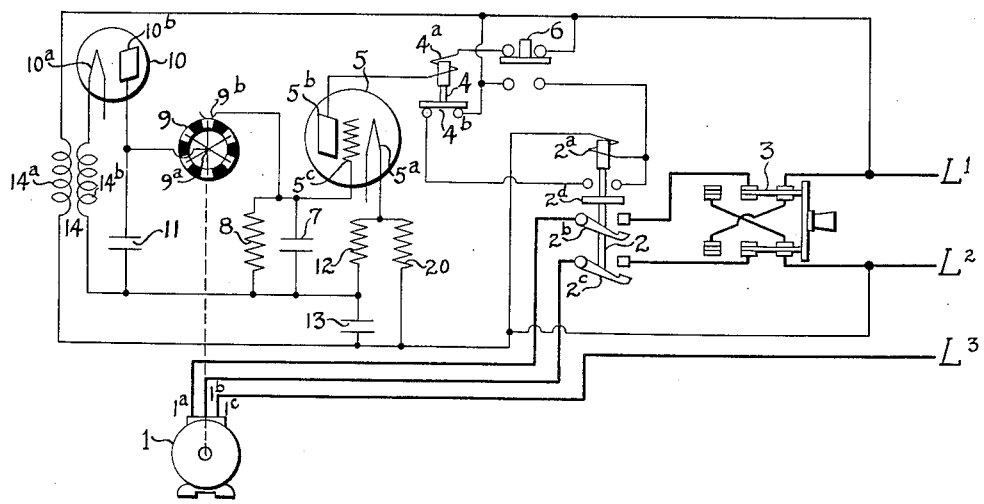

In Fig. 2 the motor connections are the same as in Fig. 1. In series with the cathode 5ª is a resistance 20, and in parallel with the latter is connected a condenser 13 which is in series with a high resistance 12. The tube 10 and condenser 11 are supplied with power from the secondary coil 14ᵇ of a transformer 14 whose primary coil 14ª is connected to the lines L¹ and L².

When the potential of grid 5ᶜ has reached the critical value, and the tube 5 supplies current to coil 4ª, the current produces a voltage drop in the resistance 20. This voltage drop charges condenser 13, its plate connected to resistance 12 assuming a positive potential. During the half cycles when the tube 5 is non-conducting this potential which is gradually reduced by discharge through resistor 12 partially neutralizes the effect of the negative charge impressed upon the grid by the condenser 11. By proper design of condenser 13 and resistor 12 it is possible to maintain the potential of grid 5ᶜ at such a value, that the tube 5 will again conduct during the next positive half cycle, so as to maintain the relay 4 energized, irrespective of the action of the commutator 9. The tube 5, after having once responded to conduct current will thus continue to carry current during succeeding alternate half cycles, without any further voltage impulses from the sources which supplied the first impulse.

In Fig. 3 the coil 4ª is connected between two resistances 15 and 16 which are connected in series between the lines L¹ and L². In all other respects the connections are the same as in Fig. 1. If with this system, the current through tube 5 and coil 4ª has once been started, it will, due to the inductance of coil 4ª, continue to flow during the negative half cycle in a loop comprising the tube 5, coil 4ª and resistor 16 as the grid cannot exert any control, while current is flowing in the tube. In this manner, after having been started, the current in the coil 4ª will be maintained indefinitely.

In Fig. 4 a tube 17 having a cathode 17ª, an anode 17ᵇ, a grid 17ᶜ and an auxiliary anode 17ᵈ is connected in circuit with the coil 4ª of the system. A transformer 18 has a primary winding 18ª connected to an alternator 19 which is coupled to the motor 1 and rotates with it, so that the frequency of the current is a measure of the speed of the motor. The secondary winding 18ᵇ of the transformer is connected between the anode 17ᵈ and the grid 17ᶜ.

When the motor is running the potential of the anode 17ᵈ becomes alternately positive and negative with respect to the cathode 17ª. At the time when the anode 17ᵈ is positive, electrons from the cathode 17ª are drawn to the anode 17ᵈ and pass through the winding 18ᵇ to the grid 17ᶜ and the plate of the condenser 7 which is connected with it. As long as the potential of the grid 17ᶜ is sufficiently negative the tube 17 cannot supply any current to the winding 4ª. During the next half cycle the anode 17ᵈ is negative, and the negative potential of grid 17ᶜ is lowered by discharge of condenser 7 through the resistance 8. The final value of the grid potential depends upon the duration of the discharge period. As the motor 1 slows down, the voltage and frequency of the generator 19 decreases, and thus the discharge period of the grid 17ᶜ increases, so that ultimately at a given low speed the grid will attain a sufficiently low potential to permit a current flow to the coil 4ª, thus causing response of the system in the aforedescribed manner.

While I have described the invention as applied to a motor for stopping its power supply, it is obvious that by slight modification of the connections, it may be used to control the power supply so as to maintain a certain speed of the motor and other modification within the scope of the invention will suggest themselves readily to one skilled in the art.

What we claim as new and desire to secure by Letters Patent is:

1. In combination, a dynamo-electric machine, an electron tube for controlling a circuit of the dynamo-electric machine and having a grid, means to impress upon said grid a periodic potential the frequency of which varies in accordance with a characteristic of the machine, to render said tube non-conducting and discharge means to vary said potential to render said tube conducting.

2. In combination, a motor, a current supply therefor, an electron tube for controlling said supply and having a grid, means to impress upon said grid a periodic potential the frequency of which varies in accordance with the motor speed, to render said tube non-conducting and discharge means to vary said potential to render said tube conducting.

3. In combination, a motor, a current supply therefor, a gaseous discharge tube for controlling said supply and having a grid, means to impress upon said grid a periodic potential the frequency of which varies in accordance with the motor speed, to delay starting of current through said tube and discharge means to vary said potential to render said tube conducting.

4. In combination, a dynamo-electric machine, a discharge tube for controlling a circuit of the dynamo electric machine, and having a grid, means to impress upon said grid a periodic potential, the frequency of which varies in accordance with a characteristic of the machine, to render the tube non-conducting, discharge means to vary said potential to render said tube conducting and means to maintain said tube conducting after response to said discharge means.

5. In combination, an alternating current motor, a gaseous discharge tube for controlling a circuit of the motor and having a grid, means to impress upon said grid a periodic potential the frequency of which varies in accordance with the motor speed, to delay starting of current through said tube, discharge means to vary said potential to render said tube conducting and means to maintain the tube conducting after response to said discharge means.

6. In combination, an alternating current motor, a current supply therefor, a gaseous discharge tube for controlling said supply and having a grid, an energy storage circuit connected to said grid, means to impress upon grid and energy storage circuit a periodic potential the frequency of which varies in accordance with the motor speed, to delay starting of current through said tube and to store up energy in said energy storage circuit and a discharge circuit connected to said storage circuit for discharging the stored up energy to thereby vary the grid potential to render said tube conducting.

7. In combination, an alternating current motor, a current supply therefor, a gaseous discharge tube for controlling the motor current and having a grid, a condenser and a source of current connected to said grid, said source impressing upon the grid a periodically varying potential whose frequency varies with the motor speed and which renders said tube non-conducting while storing up energy in said condenser and a resistance connected in parallel with said condenser to discharge said energy and to render said tube conducting at a given frequency.

8. In combination, an alternating current motor, a current supply therefor, a gaseous discharge tube for controlling the motor current and having a grid, a condenser and a source of current connected to said grid, said source impressing upon the grid a periodically varying potential whose frequency varies with the motor speed and which renders said tube nonconducting while storing up energy in said condenser, a resistance connected in parallel with said condenser to discharge said energy and to render said tube conducting at a given frequency and means to maintain said tube conducting after response to said given frequency.

9. The combination with a translating device, of an alternating current supply, a unidirectional gaseous discharge tube in series with said translating device and said supply and having a grid, means in circuit with said translating device for storing energy while said tube is conducting during a working half cycle and means to impress upon said grid a transient voltage resulting from the discharge of said energy after termination of the conducting period to thereby render said tube again conducting during a succeeding working half cycle.

10. The combination with a translating device, of an alternating current supply, a unidirectional gaseous discharge tube in series with said translating device and said supply, an impedance in series with said tube capable of storing energy while said tube is conducting during a working half cycle, and a discharge path including said impedance and said tube for discharging the energy stored up, after the instantaneous voltage of the circuit has fallen to a value incapable of maintaining the tube conducting, to thereby continue the current through the tube and maintain its conductivity during the succeeding cycle.

11. The combination with a translating device, of an alternating current supply, a unidirectional gaseous discharge tube in series with said translating device and said supply and having a grid, means to impress upon said grid a potential to initiate current flow through said tube, an impedance in series with said tube capable of storing energy, and a discharge path including said impedance and said tube for discharging the energy stored up, after the instantaneous voltage of the circuit has fallen to a value incapable of maintaining the tube conducting, to thereby continue the current flow through the tube and maintain its conductivity during the succeeding cycle.

12. In a system of control for an alternating current motor, in combination, a gaseous discharge tube for controlling a circuit of said motor and having a grid, means to impress upon said grid a periodic potential the frequency of which varies in accordance with the motor speed to delay starting of current through said tube, discharge means to vary said potential to render said tube conducting, an impedance in series with said tube, capable of storing energy, and a discharge path including said impedance and said tube for discharging the energy stored up, after the instantaneous voltage of the circuit has fallen to a value incapable of maintaining said tube conducting, to thereby continue the current through said tube and maintain its conductivity during the succeeding cycle.

13. In combination, an alternating current motor, a current supply therefor, means for reversing said supply for plugging the motor, an electromagnetic switch in circuit with said supply, a gaseous discharge tube for controlling said electromagnetic switch and having a grid, means to impress upon said grid a periodic potential, the frequency of which varies with the motor speed, to render said tube non-conducting and permit supply of power to the motor when the speed of said motor is high and discharge means for varying said potential and rendering said tube conducting to thereby disconnect said motor from its supply when, upon plugging, the speed approaches zero.

PRESCOTT CROUT.
CARROLL STANSBURY.